Nov. 3, 1953 — W. H. HANNAHS — 2,658,013
FLUX FOR HARD SOLDERING OF TUNGSTEN
Filed June 28, 1949

INVENTOR.
Wilson H. Hannahs

Patented Nov. 3, 1953

2,658,013

UNITED STATES PATENT OFFICE 2,658,013

FLUX FOR HARD SOLDERING OF TUNGSTEN

Wilson H. Hannahs, Westbury, N. Y., assignor to Sylvania Electric Products Inc., a corporation of Massachusetts Application June 28, 1949, Serial No. 101,750

1 Claim. (Cl. 148—24)

This invention relates to soldering flux; more particularly it relates to fluxes for the hard soldering of tungsten.

It has heretofore been impracticable to braze tungsten to tungsten or to other metals with silver solders or with solders melting between 1150° F. to 1800° F.

It is an object of this invention to improve soldering technique in order to make feasible good tungsten to tungsten combines with the use of solders such as silver solders which melt within the range of 1150° F. to 1800° F.

A further object of this invention is to provide a flux which will make such soldering feasible.

Still another object of this invention is to provide a flux which will promote the production of a strong bond between tungsten and the solder used.

It has been found that these objects and other advantages can be obtained by the addition of powdered iron to standard fluxes of the well-known borax paste type.

In the drawing Figs. 1 and 2 are photomicrographs of longitudinal section of a copper-solder-tungsten interface in which a standard borax flux has been used in an effort to braze the copper to the tungsten.

Figure 2:
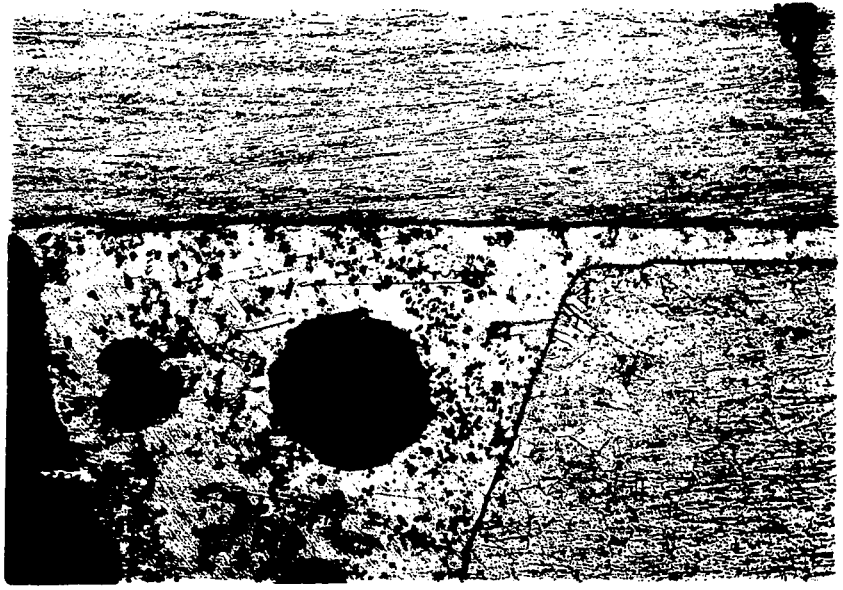

Fig. 2 which is a longitudinal section of the same interface at a point down inside the copper sleeve clearly shows the close interface between the copper and the solder with signs of alloying and diffusion as compared with the tungsten solder interface where no wetting is observable.

Figure 3:
Figs. 3 and 4 are similar longitudinal sections of copper-solder-tungsten interfaces which have been brazed together with a standard flux containing iron powder.

Fig. 3 is a photomicrograph showing a similar section of copper-solder tungsten interface where the special flux has been used. From this photomicrograph it can readily be seen that the solder has wet the tungsten surface.

Figure 1:
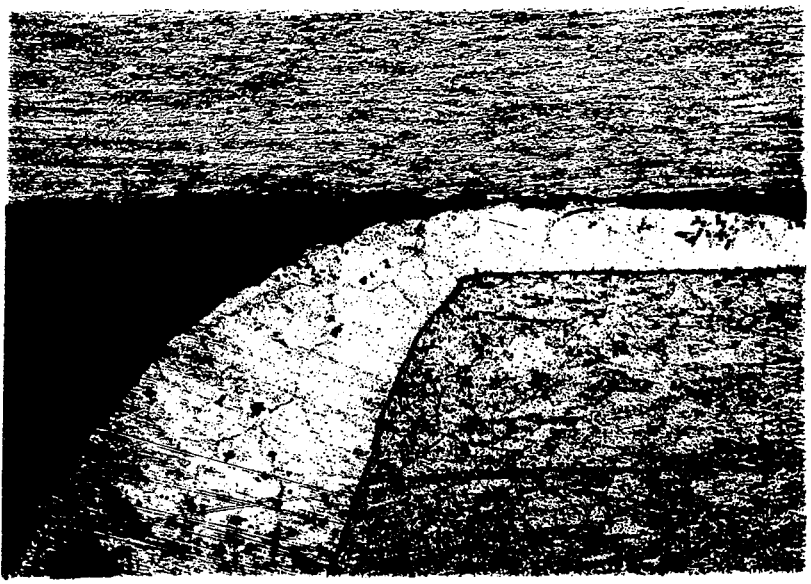
Fig. 1 shows the interface which is produced with the standard flux at the exposed top of a seal of a copper sleeve surrounding a tungsten element. From this it is readily seen that the solder has not wet the tungsten.
Figure 4:
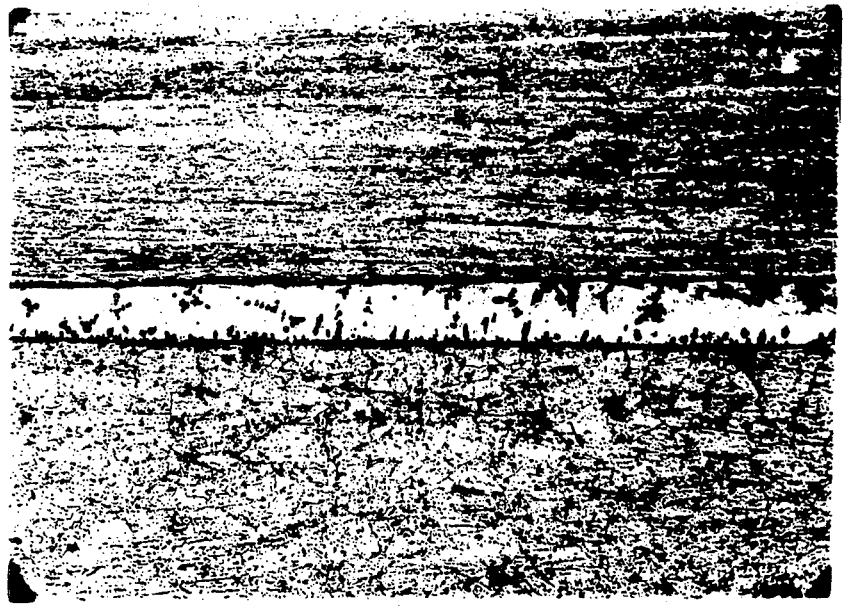

Fig. 4 is a photomicrograph of a section similar to Fig. 1 in which the close interface of solder tungsten can readily be seen and compared to the wide gap between the solder tungsten interface when the standard flux is used. The rather large black island observed in the solder using the special flux and not observed in the solder using the standard flux were found to be copper-rich solid solutions of copper and silver which may have been caused by variations in the compositions of the solder wire along its length, the approximate composition of the solder being 72% silver and 28% copper, or that the braze using the special flux may have been either a little hotter or a little longer than the other causing more copper from the copper sleeve to fuse into the solder and later crystallize as a copper-rich solid solution.

It is, however, particularly noteworthy that no signs of the iron appear anywhere in the copper, solder or tungsten or at their interfaces. This clearly indicates that the iron has remained in the flux.

Since the iron powder does not remain in the weld either at the interface or near it, it must in some manner influence the effectiveness of the flux itself. Since the effectiveness of a flux of the boric acid potassium borate type is dependent upon its ability to dissolve the oxide film, thus forming a glass which will slag off and leave the metal clean, it is evident that the iron enters into some solution with the glass formed, probably as iron oxide. Since theoretically the larger the difference in melting points between the flux and the oxide to be dissolved, the more difficult is the solution of the oxide in the glass, it is self-evident that the iron powder must perform one function, that is, remove in some way the oxide of the tungsten. The iron powder may possibly do this in two ways, the true mechanism probably being a combination of these, (1) The iron powder upon being heated oxidizes to iron oxide which dissolves readily in the molten flux because of the fine particle size and free dispersion in the molten glass. The solution of the iron oxide in the glass then raises the melting point of the glass thus narrowing the difference of melting points between glass and oxide and thus allowing the $WO_3$ to dissolve (or be dispersed) more easily in the molten flux. It is therefore quite understandable that iron oxide when added to the flux has somewhat the same effect as iron powder but to a lesser degree; (2) the second effect the iron powder may have is one of reduction when it comes in contact with the $WO_3$ to reduce it to tungsten and the iron oxide formed.

In order to produce a flux which is suitable for hard soldering of tungsten either to tungsten or to other metals with silver solders, in accordance with this invention, one may make use of any of the well known fluxes of the borax paste type which are either primarily made of borates or a mixture of borates and fluorides. To this flux is then added 1 to 12% of powdered iron. This powdered material is prefereably in finely divided form and free of impurities. For this reason carbonyl iron having a particle size between 3 and 20 microns is preferably used. The mixture is made by stirring the iron into the borax flux if it is in paste form. A good example of a flux which is suitable for such use is one for example, which contains 11% by weight of potassium tetraborate, 47% by weight of boric acid, 35% by weight of water and 7% by weight of powdered iron, the mixture being milled for 12 hours in a ball mill.

When an improved flux of the above-described type is used, tungsten can readily be brazed to tungsten or to other metals such as copper at temperatures ranging from 1150° F. to 1800° F. to produce firm bonds in which the interface between the tungsten and solder shows signs of having been thoroughly wetted and alloyed. The photomicrograph given as in Figs. 3 and 4 clearly indicate the type of joints which can thus be obtained.

It has also been found that iron oxide can be added to borate type pastes to obtain improved results in the brazing and soldering of tungsten. This however forms a high melting flux whereas the fluxes prepared with iron powder start out as low melting fluxes whose characteristics change during the welding operation to those of high melting fluxes. This may be brought about by the oxidation of the iron to iron oxide. Although such compositions containing iron oxide may be used for brazing, their use however, requires more skill than is necessary when using fluxes containing iron powder and the results are for the most part less predictable. However, if it is desired to make use of iron oxide in place if iron powder a good example of a flux is one in which 2.1 grams of $Fe_2O_3$ has been added to 3.9 grams of patassium tetraborate, 1 gram of boric acid and 3 grams of water.

While the above description and the drawings submitted herewith disclose preferred and practical embodiments of the flux of this invention, it will be understood by those skilled in the art that the specific details as shown and described are by way of illustration and are not to be construed as limiting the scope of the invention.

What is claimed is:

A flux suitable for the hard soldering of tungsten consisting essentially of a mixture of approximately 11 parts by weight of potassium tetraborate, 47 parts by weight of boric acid, 35 parts by weight of water and 7 parts by weight of powdered iron.

WILSON H. HANNAHS.

References Cited in the file of this patent

UNITED STATES PATENTS

| Number | Name | Date |
|---|---|---|
| 80,036 | Tryon | July 14, 1868 |
| 142,939 | Popping | Sept. 16, 1873 |
| 147,576 | Schierloh | Feb. 17, 1874 |
| 165,378 | Slater | July 6, 1875 |
| 301,032 | Wilkins | June 24, 1884 |
| 432,497 | Straut et al. | July 15, 1890 |
| 496,116 | Gale | Apr. 25, 1893 |
| 756,080 | Tichen | Mar. 29, 1904 |
| 852,017 | Ellis | Apr. 30, 1907 |
| 1,460,476 | Campbell et al. | July 3, 1923 |
| 1,562,330 | Ireland | Nov. 17, 1925 |
| 1,581,446 | Hoxie | Apr. 20, 1926 |
| 1,675,664 | Reuss | July 3, 1928 |
| 2,235,965 | Ness | Mar. 25, 1941 |
| 2,369,537 | Crawford | Feb. 13, 1945 |
| 2,478,944 | Rising | Aug. 16, 1949 |

FOREIGN PATENTS

| Number | Country | Date |
|---|---|---|
| 238,811 | Germany | Sept. 13, 1911 |
| 129,052 | Switzerland | Dec. 1, 1928 |